(12) United States Patent
Vutetakis et al.

(10) Patent No.: US 6,194,100 B1
(45) Date of Patent: Feb. 27, 2001

(54) METHOD FOR MAKING VALVE-REGULATED LEAD ACID BATTERY WITH VACUUM DRAW DOWN

(75) Inventors: David G. Vutetakis, High Point; Christopher R. Cestone, Winston-Salem; Stanley K. Wilkie, Lexington, all of NC (US)

(73) Assignee: Douglas Battery Manufacturing Co., Winston-Salem, NC (US)

( * ) Notice: Subject to any disclaimer, the term of this patent is extended or adjusted under 35 U.S.C. 154(b) by 0 days.

(21) Appl. No.: 09/161,857

(22) Filed: Sep. 28, 1998

(51) Int. Cl.$^7$ .............................. H01M 2/36; H01M 4/56
(52) U.S. Cl. ........................ 429/225; 429/95; 29/623.1
(58) Field of Search ............................. 429/95, 225, 74, 429/163, 176, 50, 72; 29/623.1

(56) References Cited

U.S. PATENT DOCUMENTS

| | | |
|---|---|---|
| Re. 23,644 | 4/1953 | Grant . |
| 2,956,100 | 10/1960 | Mendelsohn et al. . |
| 4,029,855 | 6/1977 | Dougherty et al. ................ 429/82 |
| 4,114,260 | 9/1978 | DiGiacomo et al. ............. 29/623.1 |
| 4,216,280 | 8/1980 | Kono et al. ....................... 429/247 |
| 4,383,011 | 5/1983 | McClelland et al. ............... 429/54 |
| 4,425,412 | 1/1984 | Dittmann et al. .................. 429/53 |
| 4,525,438 | 6/1985 | Pearson ............................. 429/149 |
| 4,525,926 | 7/1985 | Pearson ........................... 29/623.1 |
| 4,546,053 | 10/1985 | Sundberg ........................... 429/140 |
| 4,587,181 | 5/1986 | Gibson et al. ...................... 429/59 |
| 4,618,545 | 10/1986 | Clegg et al. ....................... 429/130 |
| 4,652,505 | 3/1987 | Komaki et al. ..................... 429/131 |
| 4,713,304 | 12/1987 | Rao et al. .......................... 429/136 |
| 4,743,270 | 5/1988 | McCartney, Jr. et al. ......... 29/623.1 |
| 4,780,379 | 10/1988 | Puester ............................... 429/59 |
| 4,788,113 | 11/1988 | Bohle et al. ....................... 429/139 |
| 4,859,710 | 8/1989 | Ohmae et al. ....................... 521/55 |
| 5,075,184 | 12/1991 | Tanaka et al. ..................... 429/144 |
| 5,091,275 | 2/1992 | Brecht et al. ...................... 429/247 |
| 5,250,372 | 10/1993 | Willmann et al. ................. 429/146 |
| 5,336,275 | 8/1994 | Zguris et al. ..................... 29/623.5 |
| 5,376,477 | 12/1994 | Aidman et al. .................... 429/141 |
| 5,384,211 | 1/1995 | Choi et al. ........................ 429/136 |
| 5,401,279 | 3/1995 | Eisenhut et al. .................. 29/623.5 |
| 5,441,123 | 8/1995 | Beckley et al. .................... 180/68.5 |
| 5,468,572 | 11/1995 | Zguris et al. ...................... 429/247 |
| 5,512,065 | 4/1996 | Kump et al. ..................... 29/623.1 |
| 5,567,544 * | 10/1996 | Lyman ............................. 429/152 |
| 5,593,796 | 1/1997 | Misra et al. ...................... 429/264 |
| 5,635,312 | 6/1997 | Yanagisawa et al. .............. 429/94 |
| 5,682,671 * | 11/1997 | Lund et al. ...................... 29/623.2 |
| 5,731,099 | 3/1998 | Badger et al. ..................... 429/72 |

OTHER PUBLICATIONS

Lead/Acid Recombination Batteries: Principles and Applications; N.E. Gagshaw; Journal of Power Sources, 31 (1990); pp. 23–33.

History of Valve Regulated Lead Acid Batteries in the United States; I.C. Bearinger, The Battery Man; Dec., 1992; pp. 30–35.

Hollingsworth & Vose Company Training Manual, Jan. 1994.

* cited by examiner

*Primary Examiner*—Stephen Kalafut
*Assistant Examiner*—M. Wills
(74) *Attorney, Agent, or Firm*—Rhodes & Mason, P.L.L.C.

(57) ABSTRACT

The present invention relates to a method for making a valve regulated lead-acid battery cell including forming a flooded electrolyte lead-acid cell having an interior head space, positive and negative plates and fibrous plate separators positioned between the plates. The plates and the separators are housed in a container having flexible side walls. A vacuum is then drawn in the cell interior sufficient to create a flexure force on the cell side walls sufficient to push excess electrolyte from the fibrous mat separators leaving an amount of residual and absorbed electrolyte in the cell corresponding to proper saturation of the fibrous plate separators. The vacuum is then released thereby permitting any residual electrolyte to be absorbed into the fibrous separator material. Desirably the vacuum drawn in the cell interior is up to about 28 inches of mercury.

13 Claims, 2 Drawing Sheets

METHOD FOR MAKING VALVE-REGULATED LEAD ACID BATTERY WITH VACUUM DRAW DOWN

FIELD OF THE INVENTION

The present invention relates to a method of making Valve Regulated Lead-Acid (VRLA) battery cells. More particularly, the invention relates to an improved method for removing excess acid from the VRLA battery cells after they have been formed.

BACKGROUND OF THE INVENTION

Valve-regulated lead-acid (VRLA) batteries rely upon internal gas recombination to minimize electrolyte loss over the life of the battery, thereby eliminating the need for re-watering. Internal gas recombination is achieved by allowing oxygen generated at the positive electrode to diffuse to the negative electrode, where it recombines to form water and also suppresses the evolution of hydrogen. The diffusion of oxygen is facilitated by providing a matrix that has electrolyte-free pathways. The recombination process is further enhanced by sealing the cell with a mechanical valve to keep the oxygen from escaping so it has greater opportunity for recombination. The valve is designed to regulate the pressure of the cell at a predetermined level, hence the term, "valve-regulated". It should be noted that the term "sealed" is often times used in the art when referring to VRLA batteries. This usage is somewhat incorrect as some type of means for venting a battery cell must be provided to vent gasses generated during charging.

VRLA recombination batteries offer a number of advantages compared to flooded cell batteries. For example, the very low levels of gas discharge from this type battery permit its use for office equipment. Also, because the electrolyte is held in a matrix, there should be no electrolyte splash or spillage if the cell case is cracked or otherwise damaged. The cell has the potential to operate for some time with a cracked case. VRLA batteries are particularly suited for remote back-up power applications because they do not require the same type of periodic maintenance required by flooded cells. These differing maintenance requirements provide cost savings when VRLA batteries are used.

The liquid electrolyte in VRLA batteries is absorbed in plate separators which operate in a nearly completely saturated state. Desirably, a saturation level of between about 90 and about 99 percent is maintained in the separators. Saturation level is defined as the ratio of the weight of the electrolyte actually absorbed in the separators to the weight of the acid required to completely saturate the separators. Other definitions of this term and of the concept of saturation level are known in the art. As described above, it is necessary that some air space remain in the separators for proper recombination.

Although the separators will operate in a less than totally saturated condition when the VRLA cell is placed in service, in some instances the VRLA cell container is flooded with electrolyte when it is "formed". The term "formed" as used in the battery manufacturing art refers to placing the initial charge on the individual battery cells by passing a forming current therethrough. The present invention is concerned with the manufacturing steps that take place after a VRLA cell has been formed while in a flooded state. This temporary condition of being flooded should be distinguished from flooded lead acid cells which by design operate with plates that are submerged in electrolyte. Thus, any reference herein to a "flooded" cell refers to a VRLA cell soon after it has been formed and not to a cell intended for normal operation in a flooded state.

Excess electrolyte must be removed from VRLA batteries, after forming, so as to reach the desired level of saturation. Significantly, the amount of electrolyte remaining in the separator material must be controlled carefully for optimum battery performance. The separator material must not be completely saturated with liquid but must be left at something less than complete liquid saturation so that gas passages are provided. These gas passages are needed to facilitate the recombination process described above.

Several manufacturing techniques have been employed to remove the excess acid from the flooded VRLA cell. One method is to simply dump the excess acid from the cell relying on the weight of the cell after dumping to determine that the proper saturation level has been attained. This method is not desirable because it is messy and raises dangers from splashing corrosive electrolyte material. Moreover, it is difficult to accurately control the final saturation level of the AGM material using this method. Typically, cells so created initially are somewhat too wet to recombine with high efficiencies and must be allowed time to dry out to provide highly efficient recombinant batteries.

Another technique uses tank formed plates. The cells are then assembled using these plates and the subsequent acid fill is controlled to provide a specific unsaturated condition. While this process can provide a consistently reproducible product, it is tedious, time consuming and is one of the most expensive options.

Still another technique involves adding a controlled amount of liquid electrolyte to the unformed cell. One process for doing so is disclosed in U.S. Pat. No. 5,731,099 to Badger et al. This patent discloses an apparatus for introducing a controlled volume of an electrolyte to a battery case. Various other methods employ some aspects of these and other approaches. Not all of these approaches are discussed here.

There is a need then for a method of removing electrolyte from a "flooded" VRLA battery cell during the process of making a VRLA battery. The present invention addresses this and other needs. Further, the present invention provides additional advantages and solutions to additional problems not necessarily stated herein. The scope of the present invention includes those advantages and solutions to these additional problems.

SUMMARY OF THE INVENTION

The present invention provides several advantages for the construction of VRLA battery cells by providing more precise control over the saturation levels of the fibrous material separators used to hold electrolyte. This control is achieved while at the same time reducing personnel exposure to electrolyte. The present invention relies on a vacuum process to remove a specific amount of excess electrolyte from a flooded cell whereas previous uses of vacuum have been devoted to filling a battery cell with an initial charge of electrolyte.

The objects and advantages of the present invention are addressed by providing a method for making a VRLA battery cell including forming a flooded lead-acid cell having an interior head space, positive and negative plates and fibrous mat separators positioned between the plates. The plates and the separators are housed in a container having flexible side walls. A vacuum is drawn in the cell interior with the vacuum being sufficient to create a flexure force on the cell side walls. The force so created pushes excess free electrolyte from the fibrous mat separators leaving an amount of electrolyte in the cell corresponding to proper saturation of the separators for proper recombinant operation of the cell. The vacuum is then released thereby permitting any free electrolyte remaining in the container to be reabsorbed into the glass mat separator material.

The present invention further relates to a method for making a valve regulated lead-acid battery cell including forming a flooded lead-acid cell having an interior head space, positive and negative plates and plate separators positioned between the plates. The plates and the separators are housed in a container having flexible side walls. The method also includes connecting a source of vacuum to the interior of the battery and drawing a vacuum in the interior of the battery sufficient to cause the flexible outer walls flex inwardly so as to force a portion of the liquid electrolyte out of the fibrous plate separators. Next a portion of the electrolyte is removed from the interior of said battery. The vacuum is then released from the interior of the battery cell such that the wall flexure is relaxed and such that any free liquid electrolyte is absorbed into the plate separators. The amount of electrolyte remaining absorbed in the separators corresponds to a proper saturation level for normal recombinant operation of the battery cell.

The present invention also relates to a method for removing excess electrolyte from the cell interior of a formed flooded lead-acid battery cell having flexible cell walls and plate separators to create a VRLA battery cell. The method includes connecting the cell interior to a source of vacuum and drawing a vacuum in the cell interior sufficient to cause the cell walls to flex inwardly so as to force a portion of the electrolyte from the flooded cell such that the electrolyte remaining in the cell is sufficient for proper saturation of the plate separators. The vacuum is then released so as to allow any free electrolyte to be absorbed into the plate separators.

Accordingly, it is an object of the present invention to minimize personnel exposure to potentially hazardous battery electrolyte material during the manufacture of VRLA battery cells.

Another object of the present invention is to provide for more precise control over the final electrolyte saturation level of fibrous separators during the manufacture of VRLA battery cells.

These and other advantages, objects and aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed. The accompanying drawings, which are incorporated in and constitute a part of this specification, illustrate one embodiment of the invention and, together with the description, serve to explain the principles of the invention.

BRIEF DESCRIPTION OF THE DRAWINGS

The above and other objects, features, and advantages of the present invention will become more apparent and will be readily appreciated form the following detailed description of the preferred embodiments of the invention taken in conjunction with the accompanying drawings, in which.

DETAILED DESCRIPTION OF THE PREFERRED EMBODIMENT

The following is a list of definitions of terms used in this detailed description:

The term "flooded electrolyte" refers to a quantity of liquid electrolyte inside a battery cell container such that the liquid level of the electrolyte covers the cell plates and extends into the head space above the plate. This quantity of electrolyte corresponds to that amount needed to form a VRLA cell as part of its manufacturing process.

The term "excess electrolyte" means liquid battery electrolyte contained in a VRLA battery cell and not absorbed within a fibrous mat separator. This term refers to the amount of electrolyte that must be removed from the cell in order to leave only a desired amount of absorbed electrolyte in the cell fibrous mat separators.

The term "absorbed electrolyte" means liquid electrolyte contained in a VRLA battery cell and absorbed completely within a fibrous mat separator located between the plates of the cell. The term means that quantity of electrolyte present in the cell that is required for normal recombinant operation of the cell after forming.

The term "residual electrolyte" means that quantity of electrolyte that remains unabsorbed during the vacuum draw down but then becomes absorbed when the vacuum is released.

The term "head space" means the space inside a battery cell above the cell plates. When a cell is in a flooded condition the head space may be partially filled with liquid electrolyte. Thus, this term does not refer exclusively to an air space in the upper part of the cell.

Any suitable fibrous material may be used in the practice of the present invention and can be selected according to the cell's proposed use by one of ordinary skill. One separator material well known in the art is an Absorbed Glass Mat (AGM). A typical AGM material suitable for use in the present invention is the HOVOSORB® 65 Series available from Hollingsworth & Vose Company. This product is a 100% microglass separator with a surface area of 1.25 $m^2/g$. It is available in standard thicknesses ranging from about 1.07 mm to about 3.02 mm. Other AGM materials may be used and their selection is within the capability of one of ordinary skill.

Other types of non-glass fibrous separators may also be used in the practice of the present invention. A non-limiting example is the POLYPORE® VRLA separator material available from Daramic, Inc. This separator is constructed from a polymeric material such as polypropylene. The POLYPORE® material has good wetting characteristics and fine fiber diameter. Thus, it offers high porosity in combination with high tensile strength. The practice of the present invention includes the use of other types of non-glass fibers for this function provided they meet the performance characteristics stated herein. By way of non-limiting example non-woven fibrous mats constructed from polyethylene may be used.

Figure 2:
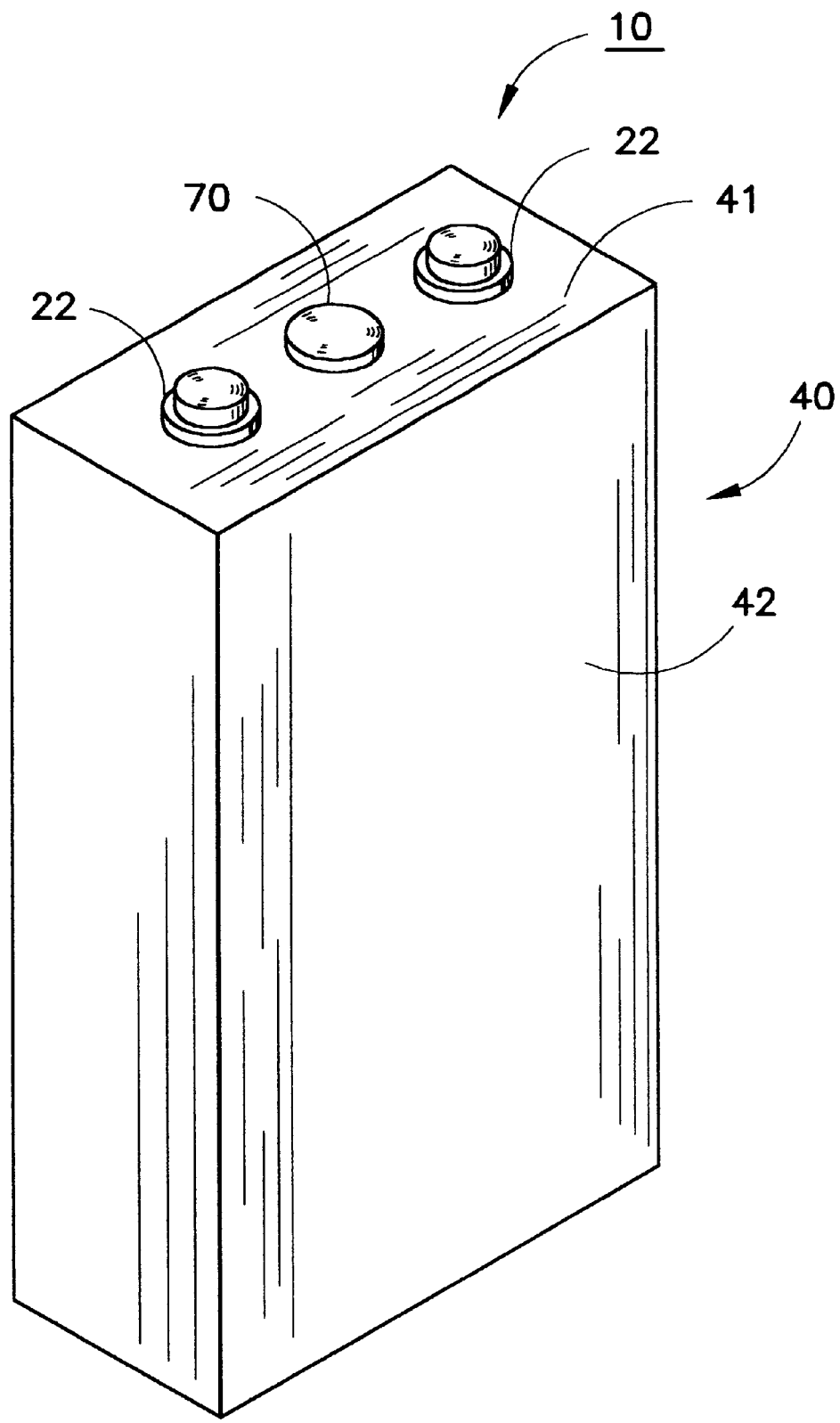
FIG. 2 is an isometric view of the battery cell depicted in FIGS. 1A–1D.

A battery cell 10 according to the present invention is shown in FIG. 2 and includes a container 40 to which is attached a top cover 41. The container includes flexible side walls 42. Terminals 22 are provided in top cover 41 as is conventional in the art. A vent valve opening 70 is provided in top cover 41 for filling the cell with electrolyte prior to forming and later installation of a vent valve. At the stage of cell manufacture with which the present invention is concerned, the vent valve has not yet been installed.

Figure 1:
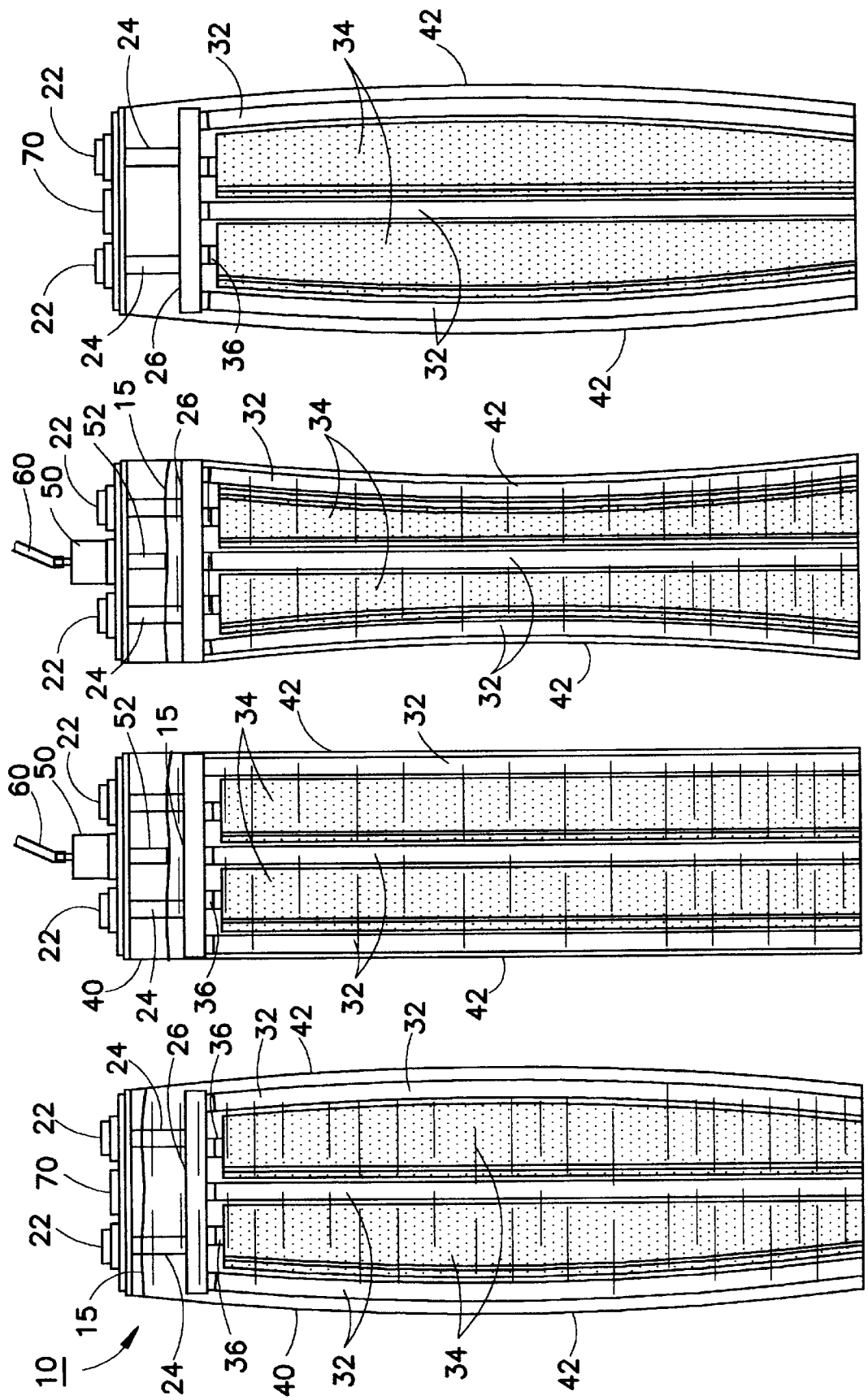
FIGS. 1A–1D are schematic representations illustrating the steps of the vacuum draw down method of the present invention.

The method for making a VRLA battery cell according to the present invention is described below in conjunction with FIGS. 1A through 1D. FIG. 1A illustrates the internal components of the cell 10 depicted in FIG. 2. The VRLA cell is flooded as it would be immediately after the cell has been formed. The electrolyte liquid level 15 extends into the head space of the cell well above the positive and negative plates 36, 32. In this example, the positive plates 36 are provided with AGM separators 34 that store the electrolyte during normal battery operation. The plates 32, 36 are connected electrically to terminals 22 via plate straps 26 and posts 24 using conventional techniques.

The side walls 42 of the cell 10 are bulged slightly at this point due to the tight fit of the internal components therein. An additional cause of the side wall relaxation is the heat generated during the formation process. This bulging has been slightly exaggerated for the purposes of illustration in FIG. 1A. Moreover, space has been shown between the individual plates 32, 36 and the container walls 42 for the purposes of illustration. Actually, these components are pressed tightly together against each other inside the container 40. These containers are referred to as "jars" in the art and typically are constructed from a thermoplastic material such as polypropylene. The containers typically are rectangular in shape and are available in widths between about 6 in. and about 8.5 in. and lengths between about 2 in. and about 12.5 in. Within these size ranges the containers may accept between about 5 and about 33 plates. The container wall thickness varies between about 0.100 in. and about 0.120 in. subject to a typical manufacturing tolerance of about 0.010 in. The walls 42, though strong and capable of withstanding the rigors of industrial use, are flexible. That is, the walls 42 will bend inwardly or outwardly under the influence of an exterior or interior force. Standard size containers suitable for the practice of the present invention are available from Hardigg Industries, Inc.

Turning now to FIG. 1B, a draw down fixture 50 has been inserted into the vent valve opening 70 so as to form an airtight seal. Draw down fixture 50 includes vacuum tube 52 which extends well into the head space of the cell 10 to a point just above the cell plates 32, 36. Draw down fixture 50 is connected via vacuum line 60 to a vacuum source such as a vacuum manifold. The vacuum manifold may comprise a vacuum vessel to which is connected a vacuum pump. The pump is controlled to maintain a predetermined level of vacuum within the vessel. The vessel in turn is connected to at least one and desirably multiple cells 10. The draw down fixture 50 may contain an internal one-way valve that permits flow out of but not into the interior of container 40. A suitable draw down fixture is available from Hardigg Industries, Inc. Alternatively, the vent valve itself could be suitably constructed with a draw down fitting and vacuum tube so as to provide means for removing excess electrolyte in addition to its primary function of controlling the internal pressure during normal operation of the cell. With this approach, the draw down fixture would not need to be removed, further simplifying the practice of the present invention.

A vacuum is then drawn in the interior of the battery cell 10 so as to draw down the electrolyte liquid level 15 to the lower end of the vacuum tube 52. If the liquid level 15 falls below the end of vacuum tube 52, some amount of air may be withdrawn from the interior of the battery cell 10. The vacuum application continues until the sides of the container 40 are bowed inwardly as shown in FIG. 1C. Again, the amount of wall flexure is exaggerated for the purpose of illustration. The wall flexure is the result of the force of atmospheric pressure acting on the walls of container 40. It will be readily appreciated that a force will be exerted on the exterior of the container walls when the pressure inside the cell 10 drops below atmospheric pressure.

The inward displacement of the walls 42 forces any excess electrolyte to rise inside the cell so that the liquid level 15 remains at approximately the lower end of vacuum tube 52. At least some of the displaced electrolyte removed by vacuum tube 52 is squeezed out of the AGM separator material 34 between the plates. Thus, as the walls 42 of the container 40 are drawn inwardly, the electrolyte liquid level 15 remains near the lower end of vacuum tube 52 even as the amount of liquid electrolyte in the container 40 decreases.

Desirably, the vacuum application continues until the flexure-created force generated by the container walls 42 pushes the excess electrolyte from the cell 10. Too much flexure-created force will leave the fibrous mat separators 34 in too dry a condition for proper recombination. Too little flexure-created force will leave the fibrous mat separators 34 too saturated for the creation of the required gas passages therein. In this latter situation additional time or other steps will have to be taken to remove additional electrolyte from the cell. There is an optimum vacuum level that creates the proper amount of wall flexure and, thus, removal of the excess electrolyte.

When the predetermined vacuum level is reached, there may be both residual electrolyte and absorbed electrolyte in the container 40. Nevertheless, the total quantity of electrolyte in the cell will be substantially equal to that amount needed for a properly functioning VRLA battery cell because excess electrolyte has been removed.

Turning now to FIG. 1D, the draw down fixture 50 has been removed, thus breaking the vacuum inside the container 40. The container walls relax and return approximately to the position shown in FIG. 1A thus permitting the liquid level 15 to fall. Desirably, substantially all of the residual electrolyte inside container 40 is absorbed into the AGM separator material 34. This absorption may not take place instantaneously but may require some amount of time to take place. Thus, there may be some quantity of residual electrolyte in the container 40 immediately after the vacuum is released.

It has been found that the final saturation level in the fibrous separator material 34 can be related empirically to the vacuum level attained inside container 40 during the step illustrated in FIG. 1C. Thus, the present invention provides the ability to "tune" the saturation level in the AGM separator material 34 by controlling the amount of vacuum drawn in the interior of the container 40. By way of non-limiting example, for a battery cell containing 11 plates, a vacuum level of up to about 20 inches of mercury provides a desirable level of AGM material saturation. Other cell sizes may require a vacuum level of up to about 28 inches of mercury. The vacuum level used will depend on various factors to include, but not limited to, the size of the cell and the number of plates and the quantity of fibrous material in the cell.

The practice of the present invention does not require that the separator material immediately and completely absorb all of any residual electrolyte present in the container 40 after the vacuum is released. A properly operating VRLA cell may contain at some time a small amount of unabsorbed electrolyte even though the separators are properly saturated.

It will be readily appreciated that various environmental and cell construction factors may vary the amount of vacuum needed to withdraw excess electrolyte from the flooded cell. For example, changing the amount of fibrous separator material contained in the same sized cell may change the amount of vacuum required to attain proper final saturation of the separators. The size of the cell may have some bearing on the required vacuum but may not be the only determinative factor. This is because a larger cell, i.e., one with a taller jar, may require less vacuum to achieve the same degree of side wall flexure, compared with a smaller cell. The amount of vacuum required may also vary with ambient conditions in the manufacturing facility to the extent those conditions effect the flexibility of the container side walls 42. For example, the ambient temperature will effect the flexural properties of the container side walls.

The advantages of the present invention include the fact that once the appropriate vacuum level has been determined for a particular cell configuration, a large number of similar cells may be manufactured quickly and consistently using the same vacuum level. The steps of weighing a cell before and after forming may be eliminated. A battery maker is thus provided with the ability to control the final electrolyte saturation level of the fibrous plate separators within tighter limits than previously possible because the vacuum level inside the container 40 may be measured precisely. The method of the present invention addresses prior problems related to VRLA cells being too "wet" to recombine properly soon after manufacture.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What we claim is:

1. A method for making a valve regulated lead-acid battery cell comprising:

a. forming a flooded electrolyte lead-acid cell having an interior head space, positive and negative plates and fibrous plate separators positioned between the plates wherein the plates and the separators are housed in a container having flexible side walls;

b. drawing a vacuum in the cell interior sufficient to create a flexure force on the cell side walls wherein the force so created is sufficient to push excess electrolyte from the fibrous mat separators leaving an amount of residual and absorbed electrolyte in the cell corresponding to proper saturation of the fibrous mat separators; and c. releasing the vacuum so thereby permitting substantially all of any residual electrolyte to be absorbed into the fibrous separator material.

2. The method of claim 1 wherein the drawing of the vacuum in the cell interior creates a vacuum of up to about 28 inches of mercury.

3. The method of claim 1 wherein the drawing of the vacuum in the cell interior creates a vacuum of up to about 20 inches of mercury.

4. A method for making a valve regulated lead-acid battery cell comprising:

a. forming a flooded electrolyte lead-acid cell having an interior head space, positive and negative plates and plate separators positioned between the plates wherein the plates and the separators are housed in a container having flexible side walls;

b. connecting a source of vacuum to the interior of the battery;

c. drawing a vacuum in the interior of the battery sufficient to cause said flexible outer walls to flex inwardly so as to force a portion of the liquid electrolyte out of the fibrous plate separators;

d. removing a portion of said electrolyte from the interior of said battery; and e. releasing said vacuum from the interior of the battery cell such that the wall flexure is relaxed and such that substantially all of any residual liquid electrolyte is absorbed into the plate separators whereby the amount of electrolyte remaining absorbed in the separators corresponds to a proper saturation level for normal recombinant operation of the battery cell.

5. The method of claim 4 wherein the drawing of the vacuum in the cell interior creates a vacuum of up to about 28 inches of mercury.

6. The method of claim 4 wherein the drawing of the vacuum in the cell interior creates a vacuum of up to about 20 inches of mercury.

7. A method for removing excess electrolyte from the cell interior of a formed flooded lead-acid battery cell having flexible cell walls and plate separators to create a VRLA battery cell comprising:

a. connecting the cell interior to a source of vacuum;

b. drawing a vacuum in the cell interior sufficient to cause the cell walls to flex inwardly so as to force a portion of the electrolyte from the flooded cell such that the electrolyte remaining in the cell is sufficient for proper saturation of the plate separators; and c. releasing the vacuum so as to allow substantially all of any residual electrolyte to be absorbed into the plate separators.

8. The method of claim 7 wherein the drawing of the vacuum in the cell interior creates a vacuum of up to about 28 inches of mercury.

9. The method of claim 7 wherein the drawing of the vacuum in the cell interior creates a vacuum of up to about 20 inches of mercury.

10. Method for making a valve regulated lead acid battery cell of the type in which fibrous mat separators are placed between positive and negative plates, and electrolyte is absorbed and stored in said separators at a prescribed level of saturation level during usage comprising:

a) providing the plates and fibrous mat separators in a container having flexible side walls and a head space above the plates and separators;

b) flooding the cell to oversaturate the fibrous mat separators to a point above said prescribed saturation level;

c) forming the cell by placing an initial charge thereon and passing a current therethrough;

d) drawing a vacuum in the interior of the container to the point that said flexible side walls are bowed inwardly and electrolyte is forced out of the fibrous separators into the head space to the point that said separators are saturated to a point less than said prescribed saturation level;

e) while the vacuum is drawn removing a portion of the electrolyte from the container until the amount of residual electrolyte in the head space and absorbed in the separators is sufficient to saturate the separators to said prescribed saturation level;

f) releasing the vacuum from the interior of the battery cell such that the wall flexure is relaxed and the residual liquid electrolyte is reabsorbed into the separators leaving the head space substantially free of liquid electrolyte.

11. The method according to claim 10 wherein the level of saturation in the fibrous separators achieved in step (d) is less than 90% by weight.

12. The method according to claim 11 wherein the vacuum drawn in step (d) is in the range of 20–28 inches of mercury.

13. The method according to claim 10 wherein said prescribed level of saturation in the separators is between 90–99% by weight of electrolyte.

* * * * *